United States Patent
Lai et al.

(10) Patent No.: US 11,429,501 B2
(45) Date of Patent: Aug. 30, 2022

(54) DEVICE, METHOD AND NON-TRANSITORY TANGIBLE MACHINE-READABLE MEDIUM FOR TRAFFIC MONITORING

(71) Applicant: ONWARD SECURITY CORPORATION, New Taipei (TW)

(72) Inventors: Chao Yeh Lai, New Taipei (TW); Yu Chieh Li, New Taipei (TW)

(73) Assignee: ONWARD SECURITY CORPORATION, New Taipei (TW)

(*) Notice: Subject to any disclaimer, the term of this patent is extended or adjusted under 35 U.S.C. 154(b) by 350 days.

(21) Appl. No.: 16/718,436

(22) Filed: Dec. 18, 2019

(65) Prior Publication Data
US 2020/0201729 A1 Jun. 25, 2020

(30) Foreign Application Priority Data
Dec. 25, 2018 (TW) .................. 107146983

(51) Int. Cl.
*G06F 11/263* (2006.01)
*G06N 7/00* (2006.01)
*G06N 20/00* (2019.01)

(52) U.S. Cl.
CPC .......... *G06F 11/263* (2013.01); *G06N 7/005* (2013.01); *G06N 20/00* (2019.01)

(58) Field of Classification Search
CPC ....... G06F 11/263; G06N 7/005; G06N 20/00
See application file for complete search history.

(56) References Cited

U.S. PATENT DOCUMENTS

| | | | |
|---|---|---|---|
| 8,730,875 B2* | 5/2014 | Noda | H04W 28/08 370/328 |
| 10,209,763 B2* | 2/2019 | Akella | H04L 45/08 |
| 2015/0215155 A1* | 7/2015 | Chow | H04W 4/38 370/242 |
| 2016/0149776 A1 | 5/2016 | Pani et al. | |

FOREIGN PATENT DOCUMENTS

| | | |
|---|---|---|
| CN | 101189895 A | 5/2008 |
| CN | 102204168 B | 12/2013 |
| CN | 104753733 A | 7/2015 |
| CN | 104811987 A | 7/2015 |
| CN | 107733921 A | 2/2018 |
| CN | 108076019 A | 5/2018 |
| JP | 2005236863 A | 9/2005 |
| TW | I629886 B | 7/2018 |

OTHER PUBLICATIONS

Taiwan Office Action, TW Application No. 107146983 dated Nov. 29, 2019, 5 pgs.
Japanese Office Action, Japanese Application No. 2019-231365 dated Mar. 9, 2021, 8 pgs.

* cited by examiner

*Primary Examiner* — Nadeem Iqbal
(74) *Attorney, Agent, or Firm* — Christensen, Fonder, Dardi & Herbert PLLC

(57) ABSTRACT

A device and method for traffic monitoring and a non-transitory tangible machine-readable medium for use in the device are disclosed. The device stores a probability model. The device records a packet quantity transmitted by a device under test in a monitoring time period. The device determines that the device under test is in an abnormal state when a probability of occurrence corresponded to by the packet quantity and the monitoring time period is lower than a probability threshold, wherein the probability of occurrence is determined by the probability model.

9 Claims, 5 Drawing Sheets

DEVICE, METHOD AND NON-TRANSITORY TANGIBLE MACHINE-READABLE MEDIUM FOR TRAFFIC MONITORING

CROSS-REFERENCES TO RELATED APPLICATIONS

This application claims priority to Taiwan Patent Application No. 107146983 filed on Dec. 25, 2018, which is hereby incorporated by reference in its entirety.

BACKGROUND OF THE INVENTION

Field of the Invention

The present invention relates to a device and a method for traffic monitoring and a non-transitory tangible machine-readable medium for use in the device. More particularly, embodiments of the present invention relate to a device, method and non-transitory tangible machine-readable medium for traffic monitoring which measure the quantity of packets transmitted by a device under test within a time interval and determine the traffic state of the device under test based on a probability model.

Descriptions of the Related Art

Conventional system monitoring technologies can be broadly classified into two categories. For the first category of conventional system monitoring technologies, a monitoring device monitors the memory state of a specific memory space of a device under test to determine whether the device under test is abnormal. Because this kind of monitoring technologies involves memory access, the monitoring device has to obtain administrative access authority of the device under test. Therefore, this kind of system monitoring technologies requires strict conditions and is inapplicable to Black Box/Grey Box test scenarios.

As to the other category of conventional system monitoring technologies, the monitoring device determines the traffic state of the device under test by analyzing the traffic content of the device under test. Specifically, the monitoring device has to be capable of anticipating all responses of the device under test that is using a specific protocol so that it can determine whether the device under test is abnormal by analyzing packet contents when it receives packets from the device under test. However, this kind of system monitoring technologies requires accurate analysis of the packet contents of the device under test, thus the implementation and operation are more complex. Furthermore, given that the protocols used by the device under test may be different, most monitoring devices has to be developed separately and results in a high development cost.

From the above description, it is understood that the conventional system monitoring technologies have the problems of insufficient compatibility, complicated implementation, and high cost. Accordingly, it is quite important in the art to solve the above-mentioned problems of the conventional system monitoring technologies.

SUMMARY OF THE INVENTION

To solve the aforesaid problems, the present disclosure provides a traffic-monitoring device. The traffic-monitoring device comprises a storage and a processor electrically connected with a device under test and the storage. The storage is configured to store a probability model. The device under test continuously transmits a plurality of packets. The processor is configured to record a first packet quantity transmitted by the device under test within a monitoring time interval. The processor is further configured to determine that the device under test is in an abnormal state when a probability of occurrence corresponded by the first packet quantity and the monitoring time interval is lower than a probability threshold, wherein the probability of occurrence is determined by the probability model.

To solve the aforesaid problems, the present disclosure further provides a traffic-monitoring method for a traffic-monitoring device. The traffic-monitoring device stores a probability model and is electrically connected with a device under test. The device under test continuously transmits a plurality of packets. The traffic-monitoring method comprises the following steps: recording, by the traffic-monitoring device, a first packet quantity transmitted by the device under test within a monitoring time interval; and determining, by the traffic-monitoring device, that the device under test is in an abnormal state when a probability of occurrence corresponded by the first packet quantity and the monitoring time interval is lower than a probability threshold, wherein the probability of occurrence is determined by the probability model.

To solve the aforesaid problems, the present disclosure further provides a non-transitory tangible machine-readable medium. The non-transitory tangible machine-readable medium is stored with a computer program, the computer program comprises a plurality of codes, and the codes are able to execute a traffic-monitoring method when the computer program is loaded into a traffic-monitoring device. The traffic-monitoring method comprises the following steps: recording a first packet quantity transmitted by a device under test within a monitoring time interval, wherein the device under test continuously transmits a plurality of packets; and determining that the device under test is in an abnormal state when a probability of occurrence corresponded by the first packet quantity and the monitoring time interval is lower than a probability threshold, wherein the probability of occurrence is determined by the probability model.

The traffic monitoring technology of the present invention determines whether the device under test is abnormal based on the packet quantity transmitted by the device under test within a specific time interval. Hence, there is no need in developing different traffic-monitoring devices for different protocols used by the device under test as in the conventional system monitoring technology. In addition, there is no need to obtain the administrative access authority on the device under test in order to perform monitoring as in the conventional system monitoring technology. Moreover, the traffic-monitoring device does not need to perform accurate analysis on the packet transmitted by the device under test, so the operational complexity is lower than that of the conventional system monitoring technology. Developers do not have to develop different traffic-monitoring devices for different protocols used by the device under test, so the development cost is lower than that of the conventional system monitoring technologies. As a result, the device and method for traffic monitoring and the non-transitory tangible machine-readable medium for use in the device provided by the present disclosure effectively solve the above-mentioned problems of the conventional system monitoring technologies.

What described above is not intended to limit the present invention, but only overall describes the technical problem that may be solved by the present invention, the technical means that can be adopted and the technical effect that can be achieved by the present invention so that the people having ordinary skill in the art can preliminarily understand the present invention. According to attached drawings and contents described in the following embodiments, the people having ordinary skill in the art can understand features claimed in the present invention.

DESCRIPTION OF THE PREFERRED EMBODIMENT

In the following description, the present invention will be disclosed with reference to embodiments thereof. It shall be appreciated that, embodiments of the present invention described below are not intended to limit the present invention to any particular environment, applications, structures, processes or steps described in these embodiments. In the attached drawings, elements unrelated to the embodiments of the present invention are omitted from depiction; and dimensions of elements and proportional relationships among individual elements in the attached drawings are only exemplary examples but not intended to limit the present invention. Unless stated particularly, same (or similar) element symbols may correspond to same (or similar) elements in the following description. Unless stated particularly, the number of each of elements described below means one or more while it may be implemented.

Figure 1:
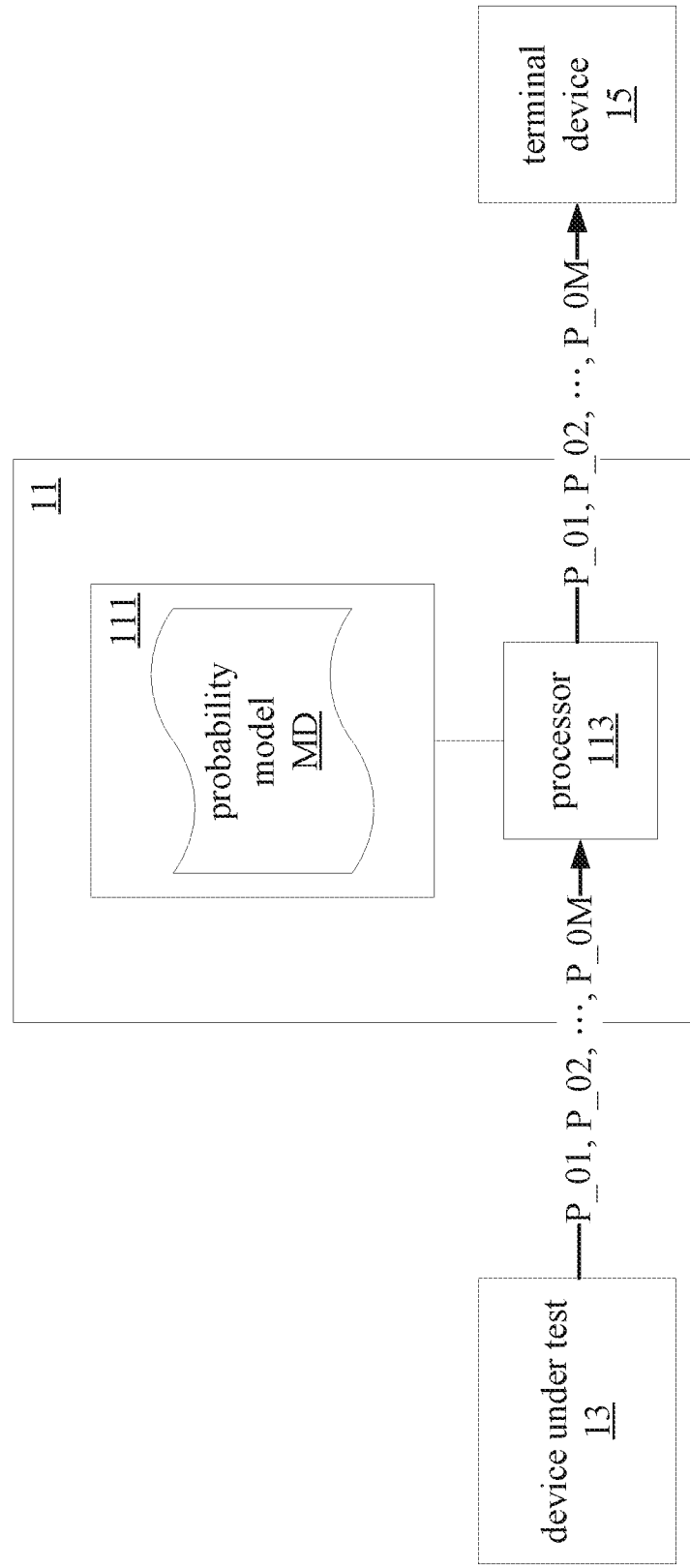
FIG. 1 depicts a schematic view of a traffic-monitoring system according to one or more embodiments of the present invention.

FIG. 1 depicts a schematic view of a traffic-monitoring system 1 according to one or more embodiments of the present invention. The content shown in FIG. 1 is only for the purpose of illustrating the embodiment of the present invention rather than for limiting the present invention.

Referring to FIG. 1, a first embodiment of the present invention is a traffic-monitoring system. The traffic-monitoring system 1 may comprise a traffic-monitoring device 11, a device 13 under test and a terminal device 15. The traffic-monitoring device 11 may comprise a storage 111 and a processor 113 electrically connected with the storage 111. The device 13 under test is connected with the traffic-monitoring device 11 in a wired or wireless way, and the traffic-monitoring device 11 is connected with the terminal device 15 in a wired or wireless way. The device 13 under test continuously transmits a plurality of packets to the terminal device 15 via the traffic-monitoring device 11. A processor 113 of the traffic-monitoring device 11 monitors the quantity of packets received and transmitted by the device 13 under test, or the processor 113 and the device 13 under test transmits packets to each other.

In some embodiments, the traffic-monitoring device 11 further comprises a transmission interface (not shown), and the processor 113 is connected with the device 13 under test and the terminal device 15 via the transmission interface. Moreover, wired connection may include connection via cables, optical fiber networks of various functions or the like, without being limited thereto. Wireless connection may include connection via Bluetooth, Wi-Fi, mobile communication networks or the like, without being limited thereto.

The device 13 under test may be a mobile communication apparatus (for example but not limited to: a smart phone, a tablet computer or the like), a networking apparatus (for example but not limited to: a server), an Internet-of-Things (IOT) device or other communication devices capable of transceiving packets. The terminal device 15 may be a communication device capable of interacting with the device 13 under test for interaction such as transceiving packets with the device 13 under test or the like. In some embodiments, the terminal device 15 and the traffic-monitoring device 11 may be disposed within the same device or may form a system together. The traffic-monitoring device 11 may directly monitor the quantity of packets transmitted by the device 13 under test. That is, the traffic-monitoring device 11 may directly participate in packet transceiving with the device 13 under test so as to more directly monitor the quantity of packets transmitted by the device 13 under test.

The storage 111 is configured to store data generated by the traffic-monitoring device 11 or data received from the outside. The storage 111 may comprise a primary memory (which is also called a main memory or internal memory), and the processor 113 may directly read instruction sets stored in the primary memory, and execute these instruction sets if needed. The storage 111 may optionally comprise a secondary memory (which is also called an external memory or auxiliary memory), and the secondary memory may transmit the stored data to the primary memory via a data buffer. For example, the secondary memory may for example be a hard disk, an optical disk or the like, without being limited thereto. The storage 111 may optionally comprise a third-level memory, i.e., a storage device that can be inserted into or pulled out from a computer directly, e.g., a mobile disk. In the first embodiment, the storage 111 stores a probability model MD.

The processor 113 is a microprocessor or microcontroller capable of signal processing or the like. The microprocessor or the microcontroller is a kind of programmable specific integrated circuit that is capable of operating, storing, outputting/inputting or the like. Moreover, the microprocessor or the microcontroller can receive and process various coded instructions, thereby performing various logical operations and arithmetical operations and outputting corresponding operation results. The processor 113 may be programmed to execute various operations or programs in the traffic-monitoring device 11.

Within a monitoring time interval, the processor 113 records a total of "M" packets transmitted from the device 13 under test to the terminal device 15, i.e., a packet P_01, a packet P_02, . . . , a packet P_0M, thereby acquiring a first packet quantity transmitted by the device 13 under test within the monitoring time interval. After acquiring the first packet quantity, the processor 113 calculates, according to the probability model MD, a probability of occurrence corresponded by the monitoring time interval and the first packet quantity, i.e., a probability of "transmitting packets of the first packet quantity by the device 13 under test within the monitoring time interval". When the probability of occurrence is lower than a preset probability threshold, it means that "transmitting packets of the first packet quantity by the device 13 under test within the monitoring time interval" may be classified into an unusual situation and, thus, the processor 113 may subsequently determine that the device 13 under test is in an abnormal state.

It shall be appreciated that the aforesaid packet quantity "M" may be a variable value. More particularly, the packet quantity "M" transmitted by the device 13 under test within each monitoring time interval may be different. Therefore, the probability calculated within different monitoring time intervals may vary.

Moreover, the probability model MD may be a calculation model that is pre-established and stored in the storage 111. The probability model MD may be used to calculate various probabilities of occurrence of transmitting specific quantities of packets within various unit time lengths of the monitoring time interval. For example, the probabilities of occurrence of transmitting 8 packets, 12 packets, 16 packets, 20 packets and 24 packets every 0.15 seconds may be obtained by using a probability function to calculate, which are respectively about 0.02, 0.08, 0.09, 0.04 and 0.01. Therefore, by using the probability model MD, the traffic-monitoring device 11 may generate a probability value according to the quantity of packets transmitted within a unit time for subsequent comparison with the probability threshold.

Figure 2A:
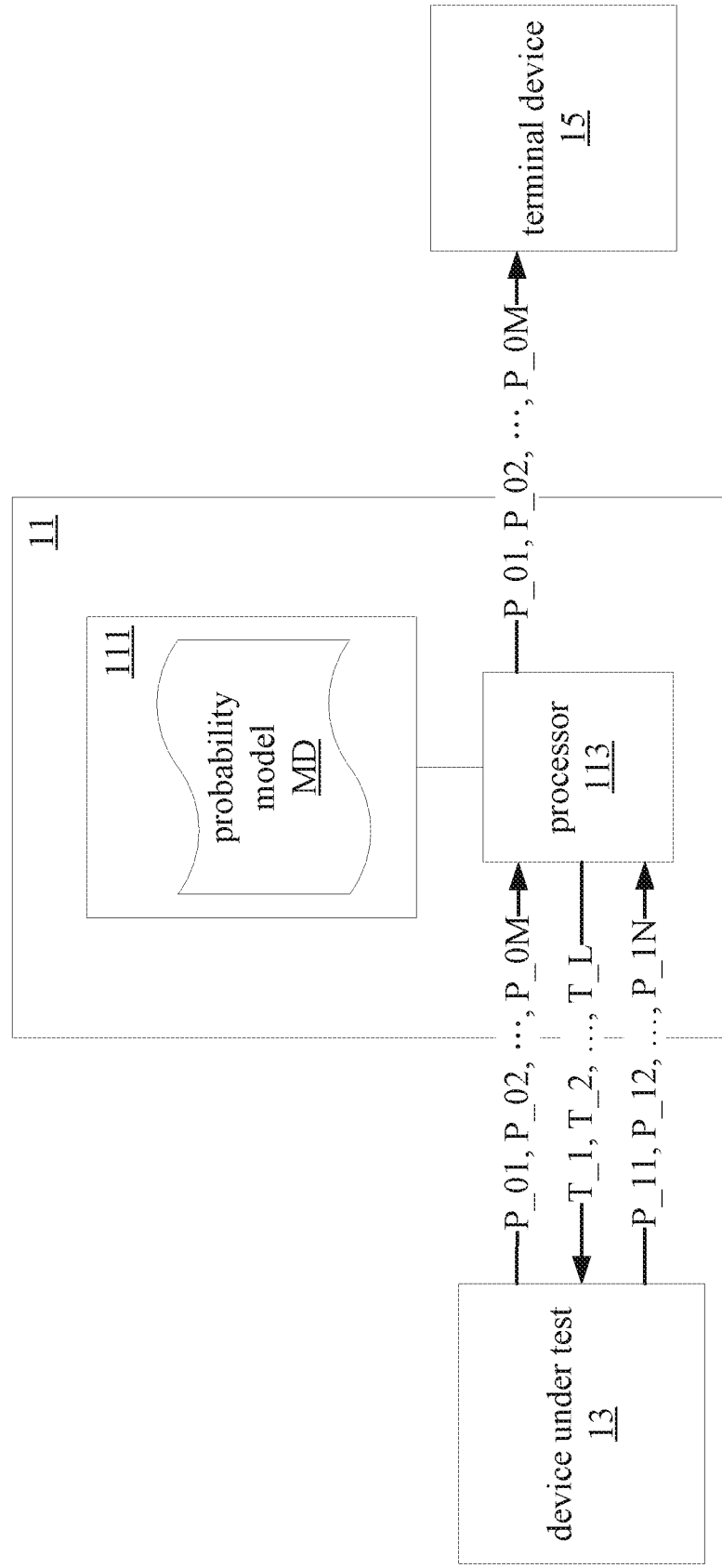
FIG. 2A depicts a schematic view of another traffic-monitoring system according to one or more embodiments of the present invention.
Figure 2B:
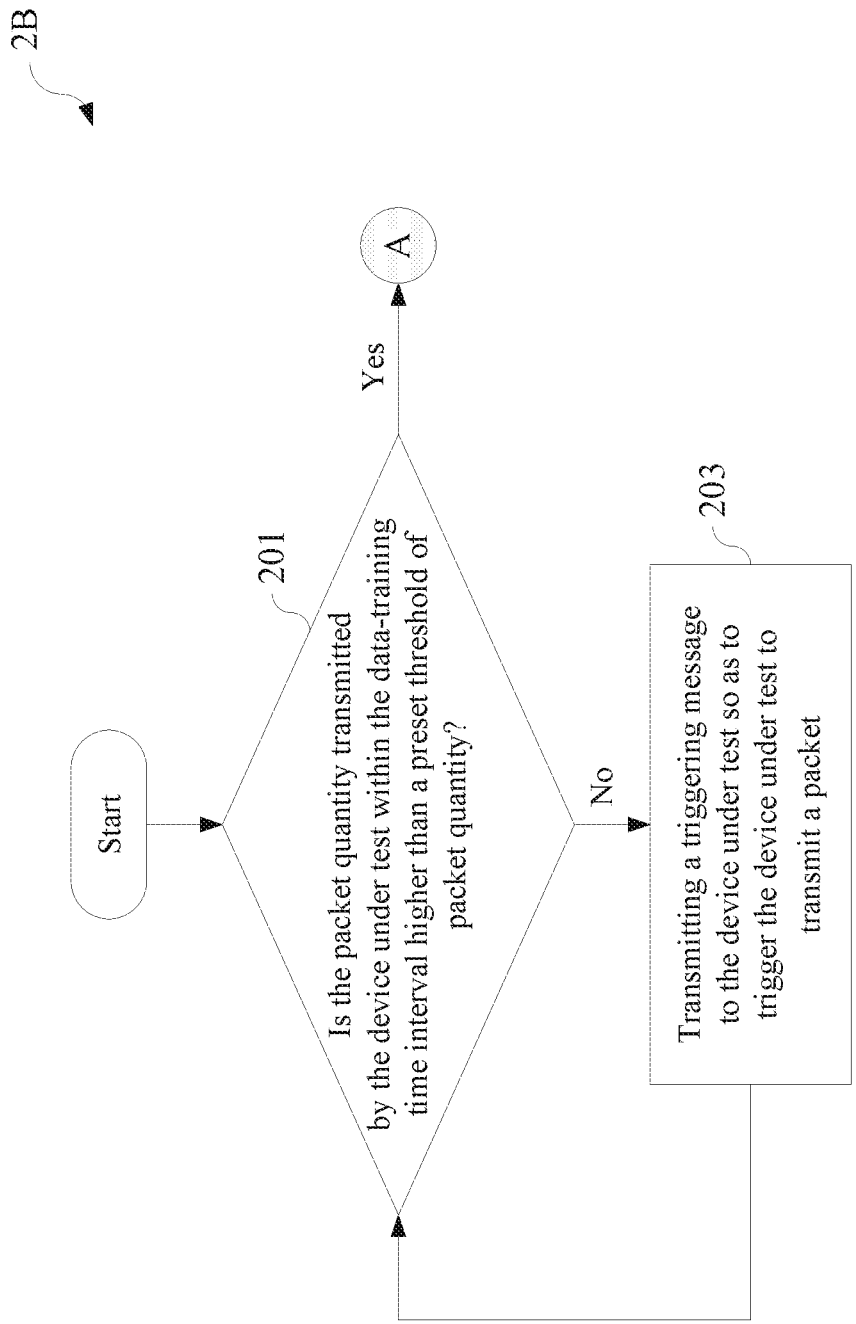
FIG. 2B and FIG. 2C depict the flowcharts of the traffic-monitoring device performing traffic monitoring on a device under test according to one or more embodiments of the present invention.
Figure 2C:
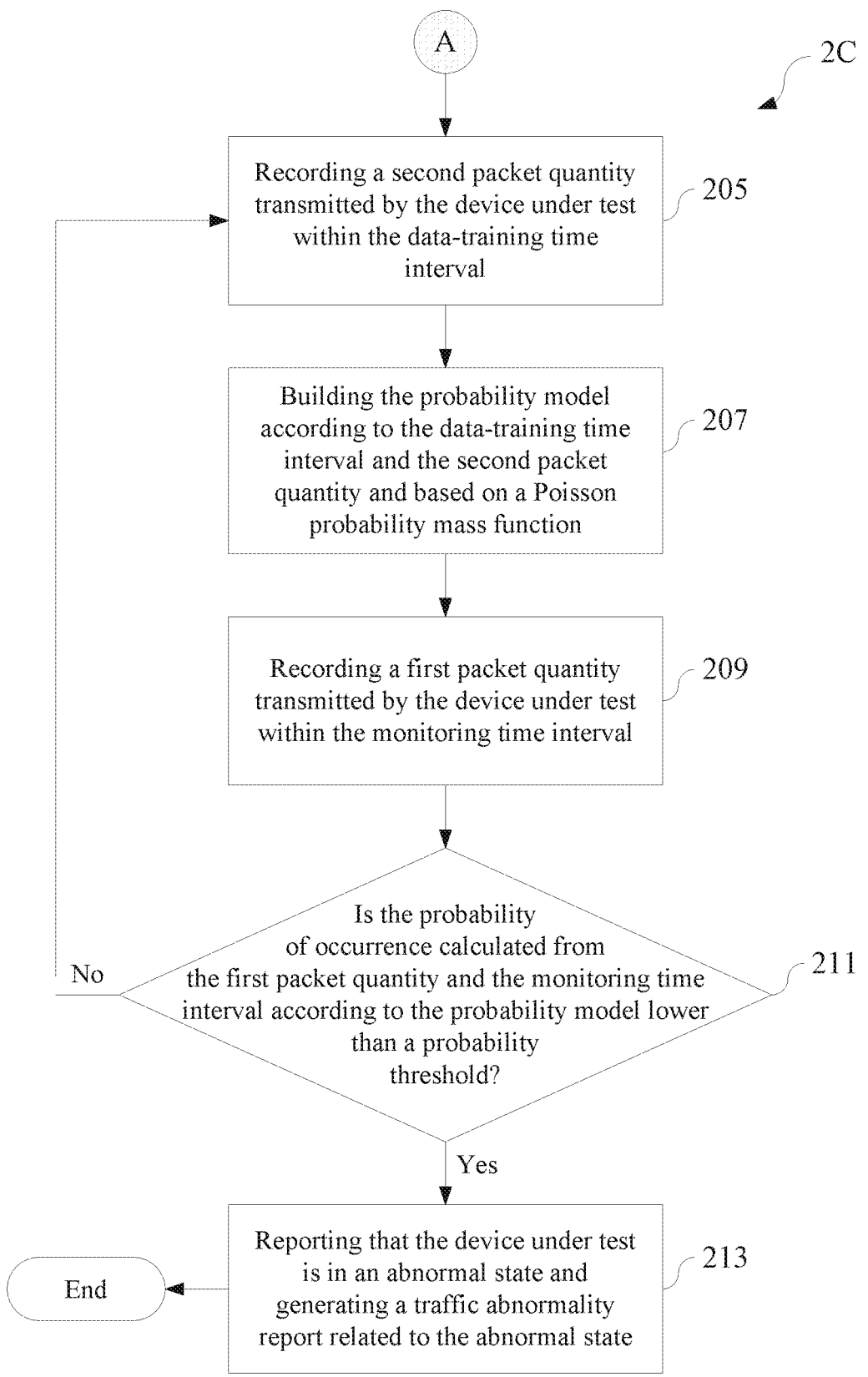

FIG. 2A depicts a schematic view of a traffic-monitoring system 2A according to one or more embodiments of the present invention. FIG. 2B and FIG. 2C depict the flowcharts of the traffic-monitoring device 11 performing traffic monitoring on the device 13 under test according to one or more embodiments of the present invention. The contents shown in FIG. 2A, FIG. 2B and FIG. 2C are only for the purpose of illustrating the embodiment of the present invention rather than for limiting the present invention.

Referring to FIG. 2A, FIG. 2B and FIG. 2C, a second embodiment of the present invention is an extension of the first embodiment. Like the traffic-monitoring system 1 in the first embodiment of the present invention, the traffic-monitoring system 2A may also comprise the traffic-monitoring device 11, the device 13 under test and the terminal device 15. In the second embodiment, the processor 113 of the traffic-monitoring device 11 is further configured to execute a traffic-monitoring process 2B and a traffic-monitoring process 2C.

In the traffic-monitoring process 2B, before recording the packet quantity transmitted by the device 13 under test within the monitoring time interval, the processor 113 may record a packet quantity transmitted by the device 13 under test within a data-training time interval and then analyze whether the packet quantity transmitted by the device 13 under test within the data-training time interval is higher than a preset threshold of packet quantity (which is labeled as an action 201). If the packet quantity transmitted by the device 13 under test within the data-training time interval is lower than the threshold of packet quantity, then the processor 113 may voluntarily transmit at least one triggering message to the device 13 under test so as to trigger the device 13 under test to transmit a packet in response to the at least one triggering message of the processor 113 (which is labeled as an action 203). Next, the processor 113 may repeat the actions 201 and 203 until the packet quantity transmitted by the device 13 under test within the data-training time interval is indeed higher than the threshold of packet quantity, and then the method proceeds to the traffic-monitoring process 2C.

For example, if the packet quantity (i.e., a total of "M" packets comprised of the packet P_01, the packet P_02, . . . , the packet P_0M) transmitted by the device 13 under test within the data-training time interval (for example but not limited to: 60 seconds) is lower than the threshold of packet quantity, then the processor 113 may continuously (for example but not limited to: at equal time interval) transmit "L" triggering messages (i.e., a triggering message T_1, a triggering message T_2, . . . , a triggering message T_L) and the device 13 under test correspondingly transmits "N" packets (i.e., a packet P_11, a packet P_12, . . . , a packet P_1N) in response to the "L" triggering messages transmitted by the processor 113. Next, the processor 113 may again analyze and confirm that the packet quantity (i.e., a sum of the packet quantities "M" and "N") transmitted by the device 13 under test within the data-training time interval is indeed higher than the threshold of packet quantity (which is for example but not limited to 30).

It shall be appreciated that, the aforesaid packet quantities "M" and "N" may be variable values. More particularly, the device 13 under test may transmit packet quantities different from "M" and "N" within each monitoring time interval. In order to establish a more accurate probability model MD, the traffic-monitoring device 11 makes the device 13 under test transmit packets of which the quantity is larger than the threshold of packet quantity.

Thereafter, in the traffic-monitoring process 2C, the processor 113 may record a second packet quantity transmitted by the device 13 under test within the data-training time interval (which is labeled as an action 205), build the probability model MD according to the data-training time interval and the second packet quantity and based on a Poisson probability mass function (which is labeled as an action 207), and then store the probability model MD in the storage 111. Specifically, the Poisson probability mass function may be as follows:

$$P_X(K) = \begin{cases} \dfrac{e^{-\mu}\mu^K}{K!} & \text{for } K \in R_X \\ 0 & \text{otherwise} \end{cases} \quad \text{(formula 1)}$$

wherein in one or more embodiments of the present invention:
"X" is a discrete random variable;
"$P_X(K)$" is the Poisson probability mass function when "X" equals to "K";
"e" is a Euler's number;
"$\mu$" is a parameter of the Poisson probability mass function; and
"K" is the first packet quantity (i.e., the packet quantity within the monitoring time interval); and
"$R_X$" represents a real number;
and in the embodiment of the present invention, the parameter "$\mu$" may be as follows:

$$\mu = S \times \frac{t}{T} \quad \text{(formula 2)}$$

wherein:
"S" is the second packet quantity (i.e., the packet quantity within the data-training time interval);
"T" is the data-training time interval; and
"t" is the monitoring time interval.

For example, the processor 113 may record a second packet quantity (for example but not limited to: 200) transmitted by the device 13 under test within the data-training time interval (for example but not limited to: 2 seconds) so as to build the probability model MD as follows:

$$P_X(K) = \frac{e^{-200 \times \frac{t}{2}}\left(200 \times \frac{t}{2}\right)^K}{K!} \quad \text{(formula 3)}$$

After building the probability model MD, the processor 113 may record the first packet quantity of the packet P_01, the packet P_02, . . . , the packet P_0M transmitted by the device 13 under test within the monitoring time interval (which is labeled as an action 209), and determine whether the probability of occurrence calculated from the monitoring time interval and the first packet quantity according to the probability model MD is lower than a probability threshold (which is labeled as an action 211), thereby determining whether the device 13 under test is in an abnormal state.

For example, the processor 13 may record that the device under test has transmitted a total of 23 packets within the monitoring time interval (for example but not limited to: 0.15 seconds). Then, the probability of occurrence corresponding to "transmitting 23 packets within 0.15 seconds by the device 13 under test" may be calculated by the probability model MD according to the above formula 3, which is about 0.0132 (i.e., 1.32%). Next, the processor 113 may confirm that the probability of occurrence (i.e., "1.32%") is lower than the probability threshold (for example but not limited to: "2%"), thereby determining that the device 13 under test is in an abnormal state.

In some embodiments, after determining that the device 13 under test is in an abnormal state, the processor 113 may report (or display) that the device 13 under test is in an abnormal state and generate a traffic abnormality report related to the abnormal state (which is labeled as an action 213) so that a user records the traffic condition of the device 13 under test or perform adjustment to the traffic on the device 13 under test.

If the probability of occurrence calculated according to the probability model MD from the first packet quantity transmitted by the device 13 under test within the monitoring time interval is higher than the probability threshold, then the processor 113 determines that the device 13 under test is not in an abnormal state and the processor 113 may repeat the actions 205, 207, 209 and 211 until it is determined that the device 13 under test is in the abnormal state or the user terminates the traffic-monitoring process 2B and the traffic-monitoring process 2C. Moreover, when the processor 113 determines that the device 13 under test is not in the abnormal state and repeats the action 205, the processor 113 may further use data of the last time (i.e., the first packet quantity and the monitoring time interval that are not determined as abnormal) as the second packet quantity and the data-training time interval so as to update the probability model MD.

In some embodiments, the user may determine whether the probability of occurrence conforms to the expectation and modify the probability threshold, thereby determining whether the device 13 under test is in the abnormal state. Similarly, if the user determines that the device 13 under test is not in the abnormal state, then the processor 113 may repeat the actions 205, 207, 209 and 211 until the probability of occurrence is lower than the probability threshold or the user voluntarily terminates the traffic-monitoring process 2B and the traffic-monitoring process 2C.

Figure 3:
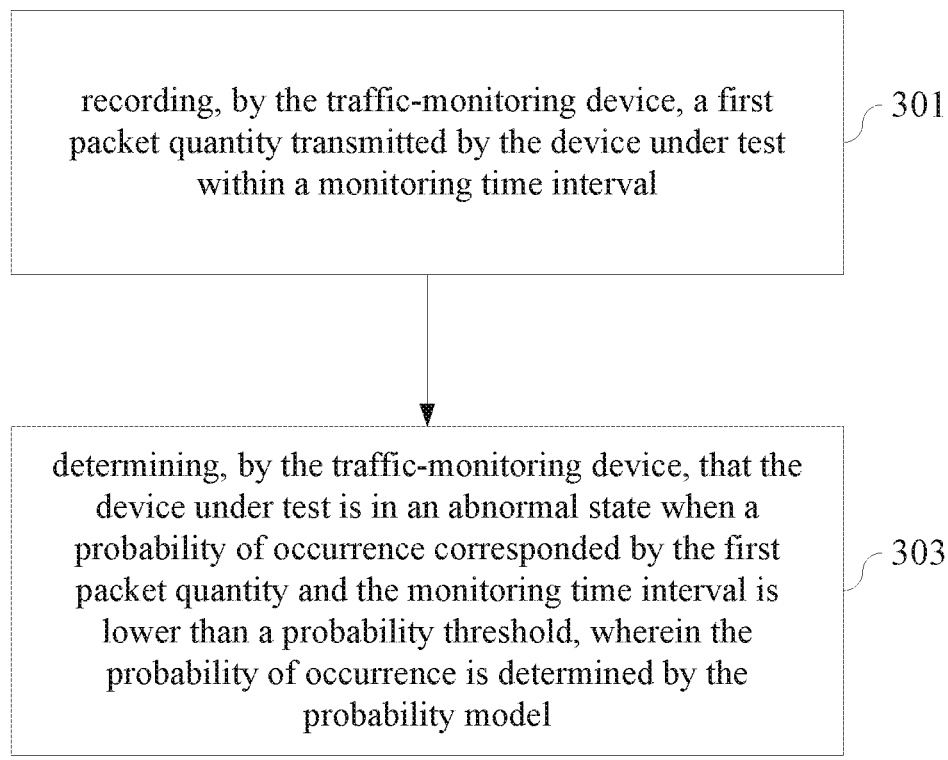
FIG. 3 depicts the flowchart of a traffic-monitoring method of the present invention.

FIG. 3 depicts the flowchart of a traffic-monitoring method of the present invention. The content shown in FIG. 3 is only for the purpose of illustrating the embodiment of the present invention rather than for limiting the present invention.

Referring to FIG. 3, a third embodiment of the present invention is a traffic-monitoring method 3 for a traffic-monitoring device (e.g., the traffic-monitoring device 11 described in the first embodiment). The traffic-monitoring device stores a probability model and is electrically connected with a device under test. The device under test continuously transmits a plurality of packets. The traffic-monitoring method 3 may comprise the following steps:

recording, by the traffic-monitoring device, a first packet quantity transmitted by the device under test within a monitoring time interval (which is labeled as 301); and determining, by the traffic-monitoring device, that the device under test is in an abnormal state when a probability of occurrence corresponded by the first packet quantity and the monitoring time interval is lower than a probability threshold, wherein the probability of occurrence is determined by the probability model (which is labeled as 303).

In some embodiments, the traffic-monitoring method 3 in the third embodiment may further comprise the following steps before the step of recording the first packet quantity:

recording, by the traffic-monitoring device, a second packet quantity transmitted by the device under test within a data-training time interval; and building, by the traffic-monitoring device, the probability model according to the data-training time interval and the second packet quantity and based on a Poisson probability mass function.

In some embodiments, the traffic-monitoring method 3 in the third embodiment may further comprise the following step:

recording, by the traffic-monitoring device, a second packet quantity transmitted by the device under test within a data-training time interval;

building, by the traffic-monitoring device, the probability model according to the data-training time interval and the second packet quantity and based on a Poisson probability mass function; and adjusting, by the traffic-monitoring device, the second packet quantity according to the first packet quantity in order to update the probability model when the probability of occurrence is higher than the probability threshold.

In some embodiments, the traffic-monitoring method 3 in the third embodiment may further comprise the following step:

transmitting, by the traffic-monitoring device, at least one triggering message to the device under test when a quantity of the plurality of packets transmitted by the device under test within the data-training time interval is lower than a threshold of packet quantity, so as to make the quantity of the plurality of packets higher than the threshold of packet quantity;

recording, by the traffic-monitoring device, a second packet quantity transmitted by the device under test within a data-training time interval; and building, by the traffic-monitoring device, the probability model according to the data-training time interval and the second packet quantity and based on a Poisson probability mass function.

In some embodiments, the traffic-monitoring method 3 in the third embodiment may further comprise the following step: generating, by the traffic-monitoring device, a traffic abnormality report according to the abnormal state.

In the third embodiment, the traffic-monitoring method 3 may also execute other steps corresponding to all the above embodiments related to the traffic-monitoring device 11 in addition to the aforesaid steps. These other steps shall be appreciated by the people having ordinary skill in the art based on the above description of the traffic-monitoring device 11, and thus will not be further described herein.

The traffic-monitoring method 3 described in the third embodiment may be implemented as a computer program comprising a plurality of codes. The codes are able to execute the traffic-monitoring method 3 in the third embodiment when the computer program is loaded into an electronic apparatus. The computer program may be stored in a non-transitory tangible machine-readable medium, for example but not limited to: a read-only memory (ROM), a flash memory, a floppy disk, a mobile hard disk, a magnetic tape, a database accessible to networks, or any other storage medium with the same function and well known to the people having ordinary skill in the art.

According to the above descriptions, the traffic monitoring technology of the present invention detects the packet quantity transmitted by the device under test within a specific time interval, generates a probability value based on a specific probability model, and determines whether the device under test is in an abnormal state by using the probability value and the probability threshold set by the user. Therefore, the device and method for traffic monitoring and the non-transitory tangible machine-readable medium for use in the device provided in the present disclosure can determine the usage state of the device under test without the need of interpreting the content of the packet. As compared to the conventional traffic-monitoring technology, the present invention provides a traffic-monitoring method of broad applicability and low complexity.

It shall be appreciated that, in the specification and the claims of the present invention, terms such as "first" and "second" in the first packet quantity and the second packet quantity are only used to represent the packet quantities monitored within different time intervals, and are not intended to limit the sequence of the packet quantities.

Although a plurality of embodiments have been disclosed herein, these embodiments are not intended to limit the present invention. Equivalents or methods of these embodiments (e.g., modifications and/or incorporations of the above embodiments) are also a part of the present invention without departing from the spirit and scope of the present invention. Any modification or equivalent that can be readily made by the people having ordinary skill in the art falls within the scope of the present invention, and the scope of the present invention is governed by the content defined in the claims.

What is claimed is:

1. A traffic-monitoring device, comprising:
   a storage, being configured to store a probability model; and
   a processor electrically connected with a device under test and the storage, wherein the device under test continuously transmits a plurality of packets, and the processor is configured to:
      transmit at least one triggering message to the device under test when a quantity of the plurality of packets transmitted by the device under test within a data-training time interval is lower than a threshold of packet quantity, so as to make the quantity of the plurality of packets higher than the threshold of packet quantity;
      record a second packet quantity transmitted by the device under test within the data-training time interval;
      build the probability model according to the data-training time interval and the second packet quantity and based on a Poisson probability mass function;
      record a first packet quantity transmitted by the device under test within a monitoring time interval; and
      determine that the device under test is in an abnormal state when a probability of occurrence corresponded by the first packet quantity and the monitoring time interval is lower than a probability threshold, wherein the probability of occurrence is determined by the probability model.

2. The traffic-monitoring device of claim 1, wherein the processor is further configured to adjust the second packet quantity according to the first packet quantity in order to update the probability model when the probability of occurrence is higher than the probability threshold.

3. The traffic-monitoring device of claim 1, wherein the processor is further configured to generate a traffic abnormality report according to the abnormal state.

4. A traffic-monitoring method for a traffic-monitoring device, the traffic-monitoring device storing a probability model and being electrically connected with a device under test, the device under test continuously transmitting a plurality of packets, the traffic-monitoring method comprising the following steps:
   transmitting, by the traffic-monitoring device, at least one triggering message to the device under test when a quantity of the plurality of packets transmitted by the device under test within a data-training time interval is lower than a threshold of packet quantity, so as to make the quantity of the plurality of packets higher than the threshold of packet quantity;
   recording, by the traffic-monitoring device, a second packet quantity transmitted by the device under test within the data-training time interval;
   building, by the traffic-monitoring device, the probability model according to the data-training time interval and the second packet quantity and based on a Poisson probability mass function;
   recording, by the traffic-monitoring device, a first packet quantity transmitted by the device under test within a monitoring time interval; and
   determining, by the traffic-monitoring device, that the device under test is in an abnormal state when a probability of occurrence corresponded by the first packet quantity and the monitoring time interval is lower than a probability threshold, wherein the probability of occurrence is determined by the probability model.

5. The traffic-monitoring method of claim 4, further comprising the following step:
   adjusting, by the traffic-monitoring device, the second packet quantity according to the first packet quantity in order to update the probability model when the probability of occurrence is higher than the probability threshold.

6. The traffic-monitoring method of claim 4, further comprising the following step:
   generating, by the traffic-monitoring device, a traffic abnormality report according to the abnormal state.

7. A non-transitory tangible machine-readable medium, being stored with a computer program, the computer program comprising a plurality of codes, the plurality of codes being configured to execute a traffic-monitoring method when the computer program is loaded into a traffic-monitoring device, the traffic-monitoring method comprising the following steps:

transmitting a triggering message to the device under test when a quantity of the plurality of packets transmitted by the device under test within a data-training time interval is lower than a threshold of packet quantity, so as to make the quantity of the plurality of packets higher than the threshold of packet quantity;

recording a second packet quantity transmitted by the device under test within the data-training time interval;

building the probability model according to the data-training time interval and the second packet quantity and based on a Poisson probability mass function;

recording a first packet quantity transmitted by a device under test within a monitoring time interval, wherein the device under test continuously transmits a plurality of packets; and determining that the device under test is in an abnormal state when a probability of occurrence corresponded by the first packet quantity and the monitoring time interval is lower than a probability threshold, wherein the probability of occurrence is determined by a probability model.

8. The non-transitory tangible machine-readable medium of claim 7, wherein the traffic-monitoring method further comprises the following step:

adjusting the second packet quantity according to the first packet quantity when the probability of occurrence is higher than the probability threshold.

9. The non-transitory tangible machine-readable medium of claim 7, wherein the traffic-monitoring method further comprises the following step:

generating a traffic abnormality report according to the abnormal state.

\* \* \* \* \*